United States Patent [19]

Gauthier

[11] 4,254,680
[45] Mar. 10, 1981

[54] CUTTER BLOCK FOR ATTACHMENT TO A SHAFT

[75] Inventor: Jean Gauthier, Soissons, France

[73] Assignee: La Rochette-Cenpa, Paris, France

[21] Appl. No.: 84,753

[22] Filed: Oct. 15, 1979

[30] Foreign Application Priority Data

Oct. 13, 1978 [FR] France ................................ 78 2949

[51] Int. Cl.³ ........................ B23D 19/06; B23D 35/00
[52] U.S. Cl. ........................................ 83/665; 83/504; 83/700; 403/5
[58] Field of Search ................. 83/665, 666, 700, 504; 403/5

[56] References Cited

U.S. PATENT DOCUMENTS 3,073,198   1/1963   Clem .................................. 83/665 X

*Primary Examiner*—J. M. Meister
*Attorney, Agent, or Firm*—Darby & Darby

[57] ABSTRACT

A cutter block for attachment to a rotatable drive shaft is composed of two semi-circular elements which are connected to one another and together form a torus. Each element has a cavity therein which is defined on the radially inner side of the element by a flexible membrane. To attach the block to the shaft, the block is slid over the shaft and the cavities are then pressurized to distort the flexible membrane. The cavities are connected to one another in gas-tight manner by a passage sealed by an O-joint.

2 Claims, 1 Drawing Figure

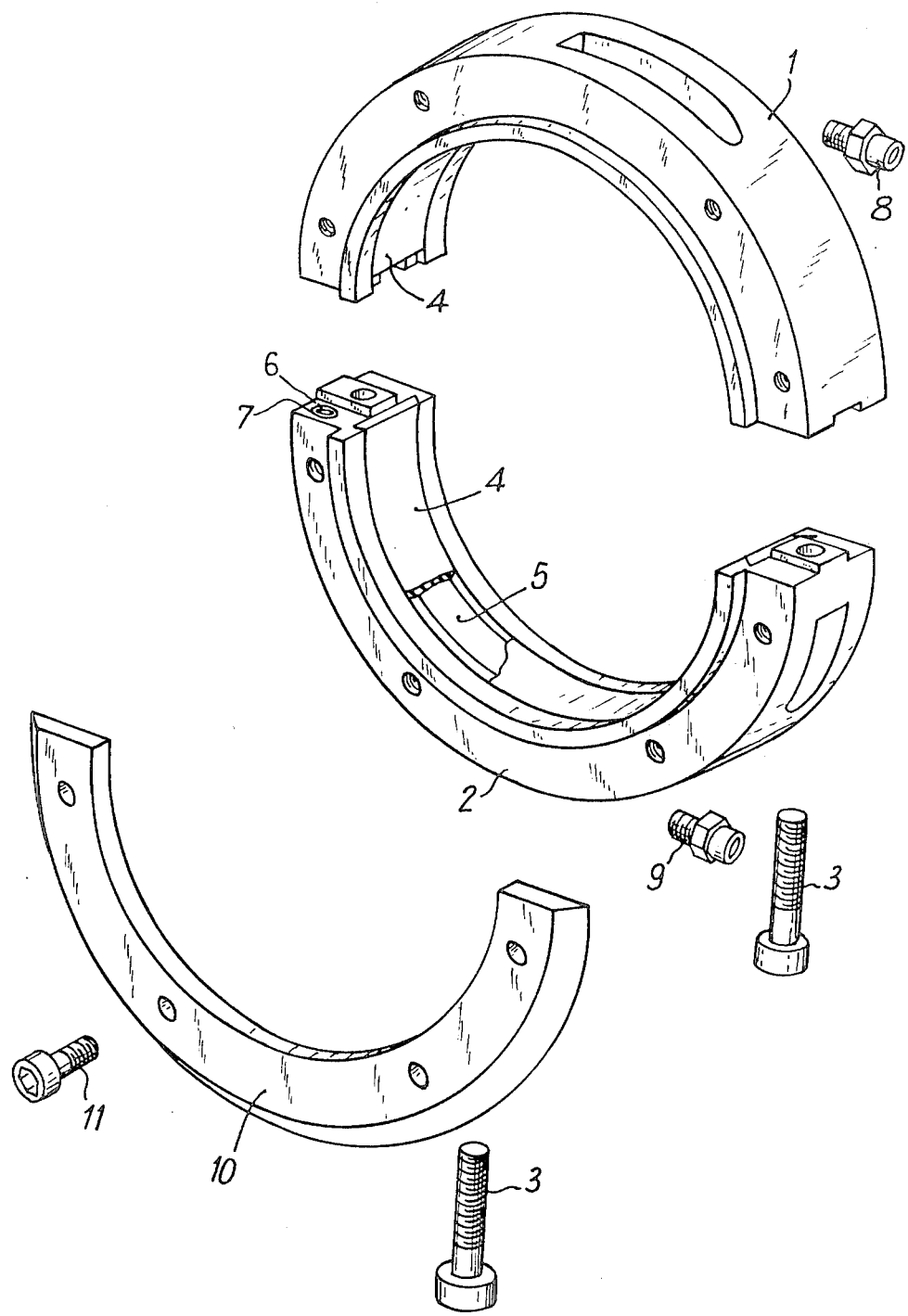

CUTTER BLOCK FOR ATTACHMENT TO A SHAFT

FIELD OF THE INVENTION

The present invention relates to a cutter block for attachment to a drive shaft, for example, a cutter block for use in shaping cardboard.

BACKGROUND OF THE INVENTION

In order to shape cardboard and other such materials use is made of rotating tools, for example, rotating knives, rotating compressors, driving cutting wheels, stencillers and segmented knives, which are mounted on rotating shafts. These different tools are attached to annular cutter blocks which are composed of two substantially symmetrical, semi-circular elements assembled on the drive shaft.

Having regard to the dimensions of the cuts which are to be made and to the processes which are to be carried out in the shaping of the cardboard, the cutter blocks have to be able to be positioned on the drive shafts in a precise and continuous way. Different processes for attaching cutter blocks on to shafts are known. Firstly, there are purely mechanical processes, such as clamping the shaft between the two symmetrical elements of the cutter block by means of a screw, or supporting a screw on a pin while the two symmetrical elements of the cutter block are put into place by means of a screw, but are not locked in relation to the shaft.

Secondly, there are processes involving distortion by the action of pressure, for example, distortion of the shaft by subjecting it to an internal hydraulic pressure, thereby to apply the shaft to a cutter block which is already in place but is not locked, or the distortion of a toric inflatable bag positioned between the shaft and the elements of the cutter block resting on the pins for example.

These various processes of attachment require more or less delicate adjustments in order to ensure correct positioning of the cutter blocks and effective locking of the cutter blocks with respect to the drive shaft. In effect it is necessary to provide for the displacement of the cutter blocks at each change in production, and this makes it essential to be able to make the necessary adjustments quickly. With the systems of clamping use a pin or an inflatable bag positional adjustments cannot be quickly carried out. The system using distortion of the shaft improves the adjustment time and functions well, but is very onerous.

BRIEF SUMMARY OF THE INVENTION

The object of the invention is to avoid the above drawbacks while providing a cutter block which is easy to make at a reduced production cost.

Another object of the invention is to improve the adjustment time of the cutter blocks sliding on open shafts, and having to be locked in position at closely defined distances with respect to the products which are to be shaped, According to the invention there is provided a cutter block for attachment to a rotatable shaft, the block being in the form of a substantially rectangular sectioned torus comprising two substantially symmetrical, semi-circular elements which are assembled to one another by a scew, each semi-circular element being hollow and having at a radially inner portion thereof a flexible membrane which defines a cavity in the said element, a passage being provided which connects the cavity in one element to the cavity in the other element, the tightness of the passage being ensured by an O-joint, whereby the cutter block is attachable to the rotatable shaft by causing it to surround the said shaft and pressurising the said cavities to cause distortion of the said membranes.

Preferably, one of the elements is provided with a feed valve via which compressed air is fed, and the other element is provided with a pressure regulator.

BRIEF DESCRIPTION OF THE DRAWINGS

The accompanying drawing is an exploded view of an embodiment of a cutter block according to the invention.

DETAILED DESCRIPTION OF PREFERRED EMBODIMENT

The cutter block shown comprises two semi-circular elements 1 and 2 which are substantially symmetrical and which can be assembled by means of a screw 3. The general shape of the cutter block is that of a substantially rectangular sectioned torus. Except for the inner side of the torus, which is composed of at least partly of a membrane 4 of a flexible material such as rubber, plastic or sheet metal, the cutter block assembly is made of a hard, machined or cast material, such as steel, aluminum or plastic. Each of the semi-circular elements 1 and 2 is hollow and includes a cavity 5. The cavities of the two elements 1 and 2 are connected by a passage 6, the tightness of which is ensured by an O-joint 7. The cavity of the element 1 provided with feed valve 8 through which compressed air or other gas is fed. The cavity of the element 2 is provided with a pressure regulator 9 which indicates whether the cutter block is under pressure, that is to say in a locked condition. By way of example, a tool 10 is shown which is capable of being attached to the cutter block, the tool being attached in fact to the element 2 by screws such as the screw 11.

The cutter block is positioned on a drive shaft, on which it slides. When its position is established a pump is connected to the valve 8, the pump being connected, for example, to a source of compressed air, so as to pressurise the cavities 5 of the substantially symmetrical semi-circular elements of the cutter block. The membrane 4 then becomes distorted and applies itself on to the shaft, which ensures that the cutter block is locked in position. If the position of the cutter block on the shaft has to be altered with respect to the articles which are to be shaped, all that is necessary is to deflate the cavities by action on the valve 8, displace the cutter block which is again slidable on the shaft, and pressurise the cavities again under the control of the pressure regulator 9. Air-tightness of the membrane 4 is ensured by vulcanization, sticking or clamping, depending on the constituent material of the membrane.

The cutter block according to the invention produces a simple and advantageous solution to the problem of the displacement of cutter blocks on a shaft and their locking in position.

What is claimed is:

1. A cutter block for attachment to a rotatable shaft, the block being in the form of a substantially rectangular sectioned torus comprising two substantially symmetrical semi-circular elements which are assembled to one another by a screw, each semi-circular element being hollow and having at a radially inner portion thereof a flexible membrane which defines a cavity in the said element, a passage being provided which connects the cavity in one element to the cavity in the other element, the tightness of the passage being ensured by an O-joint, whereby the cutter block is attachable to the rotatable shaft by causing it to surround the said shaft and pressurising the said cavities to cause distortion of the said membranes.

2. A cutter block according to claim 1, wherein one of the elements is provided with a feed valve for permitting compressed gas to be fed thereto, and the other element is provided with a pressure regulator.

* * * * *

UNITED STATES PATENT AND TRADEMARK OFFICE
CERTIFICATE OF CORRECTION

PATENT NO. : 4,254,680
DATED : March 10, 1981
INVENTOR(S) : Jean Gauthier

It is certified that error appears in the above—identified patent and that said Letters Patent is hereby corrected as shown below:

On the Title page item [30] "78 2949" should read -- 78 29249 --.

Signed and Sealed this

First Day of December 1981

[SEAL]

Attest:

GERALD J. MOSSINGHOFF

*Attesting Officer*     *Commissioner of Patents and Trademarks*